Aug. 27, 1946.  C. L. THOMPSON  2,406,445
BEARING REMOVING TOOL
Filed June 27, 1945
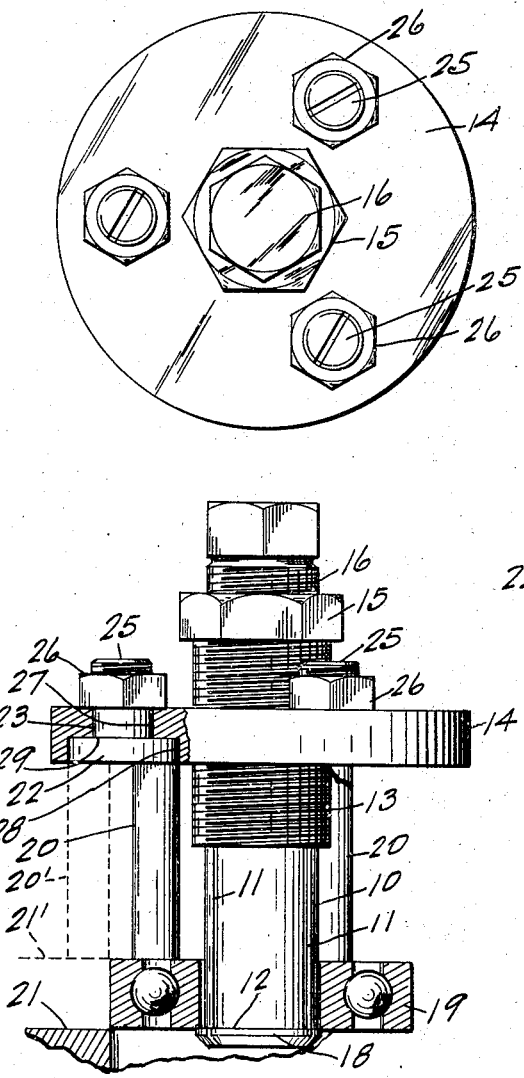
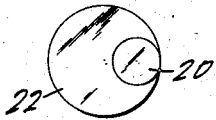
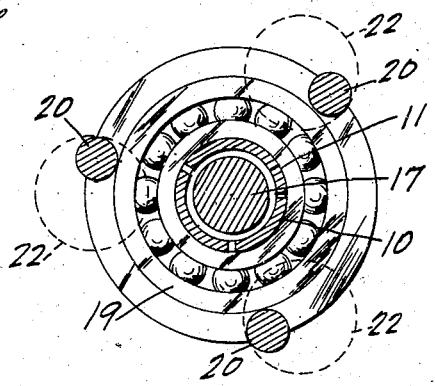
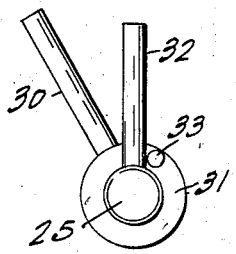
Inventor
Charles L. Thompson
By Philip A. Friedell
Attorney Patented Aug. 27, 1946

2,406,445

UNITED STATES PATENT OFFICE 2,406,445

BEARING REMOVING TOOL

Charles L. Thompson, Oakland, Calif.

Application June 27, 1945, Serial No. 601,731

3 Claims. (Cl. 29—283)

This invention, a bearing removing tool, is an improvement over the tool disclosed in my copending application Serial No. 567,823, filed December 12, 1944, in that the legs on the thrust plate are adjustable at will relative to the axis of the retracting member so that bearings and bushings can be extracted from elements such as fly wheels having a broad reaction surface or from relatively thin sleeves, and also, so that the bearing can be extracted from its housing and the legs of the tool then adjusted to cooperate with the bearing so that the bearing can be forced off of the expandible element of the tool.

With this arrangement, bearings of different diameters can be removed from relatively thin sleeves or relatively broad housings, with the legs of the tool adjustable for the most satisfactory operation.

After the bearing, particularly a ball or roller bearing, is removed by this tool, the bearing remains on the extractor, and because of the previous expansion of the extractor to grip the bearing, the extractor does not readily return to its original form so that considerable difficulty is encountered in removing the bearing from the tool. With this new arrangement, the thrust members or legs can be adjusted to cooperate with the bearing, the tool can then be operated to extract the extractor from the bearing and coincidently return the expandible elements of the extractor to their original positions, thus reforming the extractor.

The objects and advantages of the invention are as follows:

First, to provide a tool with which burnt-out, burnt-in, or worn ball bearings and the like can be rapidly and conveniently extracted from conventional housings including even relatively thin sleeves.

Second, to provide a tool as outlined with an adjustable thrust element which can be adjusted within limits to any desired diameter for cooperation with relatively broad or narrow surfaces surrounding the bearing recess.

Third, to provide a tool as outlined with a thrust plate, and legs adjustable relative to the axis of the tool so that the tool can be used to extract a bearing from its socket and thereafter, with adjustment of the legs, extract the extractor member of the tool from the bearing.

Fourth, to provide a tool as outlined with a thrust plate and legs adjustable to two positions, in one of which the legs cooperate with the surface surrounding the bearing to be extracted, and in the other of which the legs cooperate with the top surface of the bearing so that the extractor member of the tool can be retracted from the bearing and coincidently reform the extractor to its original form previous to expansion.

In describing the invention reference will be made to the accompanying drawing, in which:

Fig. 1 is a top plan view of the invention.

Fig. 2 is a side elevation of the invention shown partly in section and showing the legs adjusted for extracting the expandible element of the tool from the bearing after extraction of the bearing from its socket.

Fig. 3 is an underside view of one of the legs.

Fig. 4 is a diagrammatic view showing adjustment of the legs for a bearing of lesser diameter and mounted in a sleeve with relatively thin walls.

Fig. 5 illustrates a modification of the adjusting means for the legs and the means for securing the legs in their adjusted position.

The bearing extractor is fully disclosed in the previously mentioned application and therefore is not shown or described in detail in this application, but consists of an expandible member 10 consisting of a relatively thin sleeve longitudinally slotted as indicated at 11 and terminating at its lower end in an annular shoulder 12 and at its upper end is formed integral with the threaded sleeve 13 which operates in a threaded bore in the thrust plate 14 and has a head 15 for adjusting the threaded sleeve within the threaded bore. The expanding member 16 has its upper portion threaded to cooperate with a threaded bore in the sleeve 13 and its lower end 17 is convergently tapered to cooperate with a taper bore at the lower end of the sleeve 11, so that when the member 16 is screwed down it expands the lower end of the sleeve 11 and forces the annular ring 18 outwardly under the ball bearing 19 as indicated in Fig. 2.

By backing up the screw 15 with the legs 20 thrusting against the face of the housing 21, the bearing is extracted from its socket.

It was found that because of non-adjustability of the legs relative to the axis of the extractor, that the device was satisfactory only under conditions where the bearing was small enough to fall within the inside edges of the legs, and with bearings of relatively small outside diameter, if the surrounding surface was sufficiently wide for cooperation with the legs, therefore with small outside diameter bearings and a thin mounting sleeve, the device would not properly span the structure, and also, after a bearing was extracted, difficulty was encountered in removing the bearing from the collet, and it was to overcome these disadvantages that the present improvement was evolved.

This invention consists in making the legs 20 adjustable at will relative to the axis of the extractor, so that they can be adjusted for any arrangement or size of bearing and socket wall within the limits of adjustment, and also provide two functions for the legs, first that of absorbing the thrust for extraction of the bearing from its socket, and thereafter, to act as a thrust against the bearing to force the bearing off the extractor, and which coincidently reforms the extractor to substantially its original diameter so no difficulty will be encountered with insertion in the next bearing to be extracted. As will be understood, the same size of screw 15 can be used, it being merely necessary to change the diameter of the collet for ball bearings and the like of different internal diameters, so that only the member 15 need be changed, all of the other parts including the screw 16 being used for all bearings within the limits of the tool.

In its simplest form, the leg adjustment is provided through eccentrics. The leg 20 is secured to or formed integrally with the disc 22 and is eccentrically located on the lower side of the disc, while a shaft 23 projects axially from the upper surface and terminates in a threaded end 25 for cooperation with a nut 26 for securing the leg in adjusted position and illustrated as having a screw driver slot for adjustment. The shaft 23 operates in a bore 27 which terminates at its lower end in a counterbore 28 with the disc 22 seating on the bottom 29 of the counterbore.

Thus, for extracting the bearing, the nuts 26 are loosened, the legs 20 are adjusted to seat on the surface of the housing 21 as indicated in dotted lines at 20' and 21', the screw 15 is screwed down until the collet 18 projects through the bearing 19, the screw 16 then screwed down until the collet firmly engages the bearing, the screw 15 then screwed up until the bearing is completely retracted from its socket, which leaves the bearing hanging on the collet.

The screw 16 is then retracted and the screw 15 advanced sufficiently so that the legs can be adjusted inwardly to cooperate with the bearing as indicated in Fig. 2 after which the screw 15 is again retracted, extracting the collet from the bearing, and which coincidently springs the expandible member back to its original relation.

As illustrated diagrammatically in Fig. 4, with a bearing of lesser outside diameter mounted in a relatively thin sleeve, the legs would have to be initially adjusted to some intermediate position to seat on the top surface of the sleeve.

A modification of the adjusting and securing means for the legs is illustrated in Fig. 5. A lever 30 is fixed in the nut 31, and another lever 32 is fixed in the upper end of the screw 25, and a stop pin 33 is fixed in the nut to cooperate with the lever 32. In the position shown, the nut is free so that the leg can be adjusted to any position by moving the lever 32 if the adjustment is clockwise, and by lever 30 if the adjustment is counterclockwise, then when the leg is in proper position it is merely necessary to force the lever 30 toward lever 32 to secure the leg in adjusted position.

Thus, with the same tool, bearing extractions can be made within the limits of adjustment of the legs, and the bearings can be forced off the tool following extraction and by the same means.

I claim:

1. In a bearing extractor having a thrust plate, legs adjustably mounted in said thrust plate for adjustment relative to the axis of the extractor and adjustable at will for cooperation with the surface of the bearing housing irrespective of its width or the outside diameter of the bearing within the limits of adjustment, and in which said thrust plate has three equi-angularly spaced bores each with a co-axial counterbore, and each leg consists of a disc rotatably fitting in the counterbore and having a shaft extending from one face through the bore and threaded at its terminal end, and a leg eccentrically projecting from the opposite face, whereby rotation of the shaft and disc adjusts the span between the legs; a nut for each shaft and having a lever arm for adjustment thereof, and a lever arm for each shaft for adjustment of the leg.

2. A thrust member for a bearing extractor comprising; a plate having an axially mounted extracting element; three equi-angularly-spaced bores formed through said plate and each having a co-axial counterbore formed inwardly from the under face of the plate, and a leg for each bore and consisting of a disc member rotatably fitting in the counterbore and having its upper face seating on the bottom of the counterbore and having a shaft rotatably fitting in the bore and extending upwardly through the plate and terminating in a threaded portion, and a leg projecting eccentrically from the lower face of the disc, and a nut for said threaded portion, whereby upon loosening the nuts the span of the legs can be individually adjusted through manual operation of the eccentric legs for cooperation with selected support points for retraction of bearings, and, for retraction of the extractor from the bearing at will, said disc members providing broad supporting surfaces for rigid securing of the legs to the plate in any adjusted position.

3. A thrust member for a bearing extractor comprising; a plate having an axially mounted extracting element; three equi-angularly spaced bores formed through said plate and each having a co-axial counterbore formed inwardly from one face of the plate, and a leg for each bore and consisting of a disc member rotatably fitting in the counterbore and having a shaft rotatably fitting in the bore and extending through the plate and terminating in a threaded portion, and a leg projecting eccentrically from the opposite face of the disc, and a nut for said threaded portion, whereby the span of the legs can be adjusted at will for retraction of bearings, and, for retraction of the extractor from the bearing, a lever arm for each nut for adjustment thereof, and a second lever arm for each threaded portion for eccentric adjustment of the leg, and a stop member on said nut for limiting the relative movement of the nut and the shaft to that necessary for freeing the nut sufficiently to permit adjustment of the shaft and disc in the respective bore and counterbore.

CHARLES L. THOMPSON.